(12) United States Patent
Harrison

(10) Patent No.: US 10,333,647 B1
(45) Date of Patent: *Jun. 25, 2019

(54) SYSTEM, METHOD, AND APPARATUS FOR REDUCING DRIVING WHILE TEXTING

(71) Applicant: Benjamin L. Harrison, Valrico, FL (US)

(72) Inventor: Benjamin L. Harrison, Valrico, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/199,560

(22) Filed: Nov. 26, 2018

Related U.S. Application Data

(63) Continuation-in-part of application No. 16/041,883, filed on Jul. 23, 2018, now Pat. No. 10,169,933.

(51) Int. Cl.
| | |
|---|---|
| *H04K 3/00* | (2006.01) |
| *H04W 48/04* | (2009.01) |
| *H04W 4/029* | (2018.01) |
| *G06F 21/35* | (2013.01) |

(52) U.S. Cl.
CPC ............ *H04K 3/68* (2013.01); *G06F 21/35* (2013.01); *H04K 3/415* (2013.01); *H04W 4/029* (2018.02); *H04W 48/04* (2013.01); *H04K 2203/22* (2013.01)

(58) Field of Classification Search
CPC ............ H04K 3/00; H04K 3/415; H04K 3/68
See application file for complete search history.

(56) References Cited

U.S. PATENT DOCUMENTS

| | | | | |
|---|---|---|---|---|
| 9,900,417 | B1* | 2/2018 | Ruiz | H04M 1/667 |
| 2005/0037825 | A1* | 2/2005 | Faranda Cordella | H01Q 1/245 |
| | | | | 455/575.9 |
| 2006/0232491 | A1* | 10/2006 | Nakamura | G01R 29/0821 |
| | | | | 343/841 |
| 2011/0014863 | A1* | 1/2011 | Foster | H04K 3/415 |
| | | | | 455/1 |
| 2011/0065375 | A1* | 3/2011 | Bradley | H04M 1/72577 |
| | | | | 455/1 |
| 2012/0214408 | A1* | 8/2012 | Chronister | H04W 12/06 |
| | | | | 455/26.1 |
| 2015/0230042 | A1* | 8/2015 | McGuire | H04W 4/80 |
| | | | | 455/418 |
| 2016/0050309 | A1* | 2/2016 | Gooberman | H04M 1/72577 |
| | | | | 455/418 |

\* cited by examiner

*Primary Examiner* — Laura N Nguyen
(74) *Attorney, Agent, or Firm* — Larson & Larson, P.A.; Frank Liebenow; Justin P. Miller

(57) ABSTRACT

A system for reducing driving while texting includes a containment vessel with a door. When the door is closed, the containment vessel attenuates cellular radio signals to prevent the user device held there within from communicating with a transceiver that is external to the containment vessel (e.g. Cell Tower). A transceiver having an antenna internal to the containment vessel looks for a transceiver of the user device to detect the presence of the user device within the containment vessel. A sensor detects when the door is closed. There is a way to detecting movement of a vehicle in which the containment vessel is held and a way to log data indicating at least time periods in which movement is detected and either the door is open or the transceiver of the user device is not detected. The data is reported (e.g. to a parent/guardian).

20 Claims, 7 Drawing Sheets

SYSTEM, METHOD, AND APPARATUS FOR REDUCING DRIVING WHILE TEXTING

FIELD

This invention relates to the field of safety and more particularly to a system for reducing the use of cellular phones while driving.

BACKGROUND

Almost everybody knows that there is a greater risk of an accident when driving while distracted. Many people have caused motor vehicle accidents after minor distractions such as changing the radio station or lighting a cigarette. Lately, with the proliferation of cellphones that are capable of sending text messages, a huge increase in motor vehicle accidents have been recorded, especially when young drivers are involved. Many such accidents have led to the loss of such young people.

Texting while driving requires the driver to look at their cellphone to read the message and, as cellphone keyboards or virtual keyboards are very small, look at their cellphones while typing. For an expert at texting, this may take only a few seconds, but traveling at 55 miles per hour, a vehicle travels 403 feet in five seconds, more than the length of a football field. In those five seconds, a pedestrian may step out in front of the vehicle or another vehicle in front may stop to make a turn. Again, this is how accidents happen.

Many states have passed laws to restrict the use of a cellphone while driving, many allowing hands-free operation while driving. Hands-free operation is still a distraction (imaging a couple having a heated argument while one of them is driving), but does not require handling of the cellphone or entering information into the keyboard. It has been found that legislating the use of cellphones is about as effective as legislating the use of seatbelts. We all know someone who refuses to wear their seatbelt and we will likely know someone who texts while driving, even when such activities are illegal and may result in a ticket and/or fine.

It is therefore extremely difficult to curb cellphone usage for a majority of the population, but what about young drivers who are still under the influence of their parents? This category of drivers accounts for the majority of accidents involving such distraction, possibly because young adults are quite verse in texting and use texting as a primary form of communications with friends and family.

The prior art includes applications that a parent can load on their young driver's cellphones. One such application is LifeSaver. Once loaded on the young driver's phone, the LifeSaver application blocks phone usage while the young driver is driving. In this, the application senses that the cellphone is in a moving vehicle through the use of global positioning and accelerometer and block usage or informs parents of usage. Unfortunately, the young driver population is technology savvy and quickly learns how to disable or bypass any application that has been loaded on their cellphone. Further, it has been found that the more difficult it is to configure such applications, the quicker a parent will abort installation or install the application with minimal protection against the user (young driver) tampering with the application.

What is needed is a system that will prevent usage of a cellphone while driving.

SUMMARY

In one embodiment, a system for reducing driving while texting is disclosed including a containment vessel that has at least a partial faraday shield. The at least partial faraday shield attenuates at least cellular radio signals to/from a user device, thereby preventing the user device held within the containment vessel from communicating by way of cellular service to a transceiver that is external to the containment vessel. There is a way to insert the user device into the containment vessel (e.g. a door) and a way to detect the presence of the user device within the containment vessel (e.g. detection of a registered transceiver such as Bluetooth or WiFi). There is also a way to detect movement of a vehicle (e.g. GPS or speed sensor) in which the containment vessel is held. Data regarding time periods in which movement is detected and an absence of the user device is detected are logged and the data is reported (e.g. to a parent/guardian).

In another embodiment, a method of reducing driving while texting is disclosed including blocking external radio frequency signals from reaching a user device that is held within a containment vessel while communicating with the user device to determine that the user device is a registered device (e.g. a device of the user) and that the user device is within the containment vessel. Detecting movement of a vehicle in which the containment vessel is held and if the vehicle is moving when the user device is not within the containment vessel, logging data indicative of the vehicle moving when the user device is not within the containment vessel. Finally, reporting the data (e.g. to a parent/guardian).

In another embodiment, a system for reducing driving while texting is disclosed including a containment vessel that has a door for inserting a user device therewithin. When closed, the containment vessel attenuates at least cellular radio signals thereby preventing the user device held within the containment vessel from communicating by way of cellular service to a transceiver that is external to the containment vessel. A transceiver of the system for reducing driving while texting detects a transceiver of the registered device (e.g. the user device) to detect the presence of the user device within the containment vessel. A sensor detects when the door is closed. There is a way to detecting movement of a vehicle in which the containment vessel is held and a way to log data indicating at least time periods in which movement is detected by the means for detecting movement and either the door is open or the Bluetooth transceiver cannot connect with the user device. The data is reported (e.g. to a parent/guardian).

In another embodiment, a system for reducing driving while texting is disclosed including a containment vessel that includes shielding that attenuates cellular radio signals thereby preventing a user device held within the containment vessel from communicating to a cellular radio transceiver that is external to the containment vessel. There is a way to detect the presence of the user device within the containment vessel (e.g. detection of a registered transceiver of the user device such as Bluetooth or WiFi). There is a way to detect movement of a vehicle (e.g. GPS or speed sensor) in which the containment vessel is held. Data regarding time periods in which movement is detected and an absence of the user device from the containment vessel are logged and the data is reported (e.g. to a parent/guardian).

In another embodiment, a method of reducing driving while texting is disclosed including blocking external radio frequency signals from reaching a user device when the user device is held within a containment vessel while communicating with a radio transceiver the user device to determine that the user device is a registered device (e.g. a device of the user) by way of a unique identification received from the radio transceiver of the user device while the user device is within the containment vessel. Detecting movement of a vehicle in which the containment vessel is held and if the vehicle is moving when the user device is not within the containment vessel, logging data indicative of the vehicle moving when the user device is not within the containment vessel. Finally, reporting the data (e.g. to a parent/guardian).

In another embodiment, a system for reducing driving while texting is disclosed including a containment vessel that has a door for inserting a user device there within. The user device has a user device radio frequency transceiver. The containment vessel attenuates cellular radio signals thereby preventing the user device held within the containment vessel from communicating using cellular services. A second radio frequency transceiver of the system for reducing driving while texting searches for a signal from a user device radio frequency transceiver, the presence of the user device within the containment vessel is known when the second radio frequency transceiver receives the signal from the user device radio frequency transceiver and the user device radio frequency transceiver is authenticated as having a pre-registered unique address. A sensor detects when the door is closed and a device detects movement of a vehicle in which the containment vessel is held. At least time periods in which movement is detected and either the door is open or the second transceiver does not receive the signal from the user device radio frequency transceiver or the second radio frequency transceiver does not recognize the pre-registered unique address of the user device radio frequency transceiver are logged and such are reported (e.g. to a parent or guardian).

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
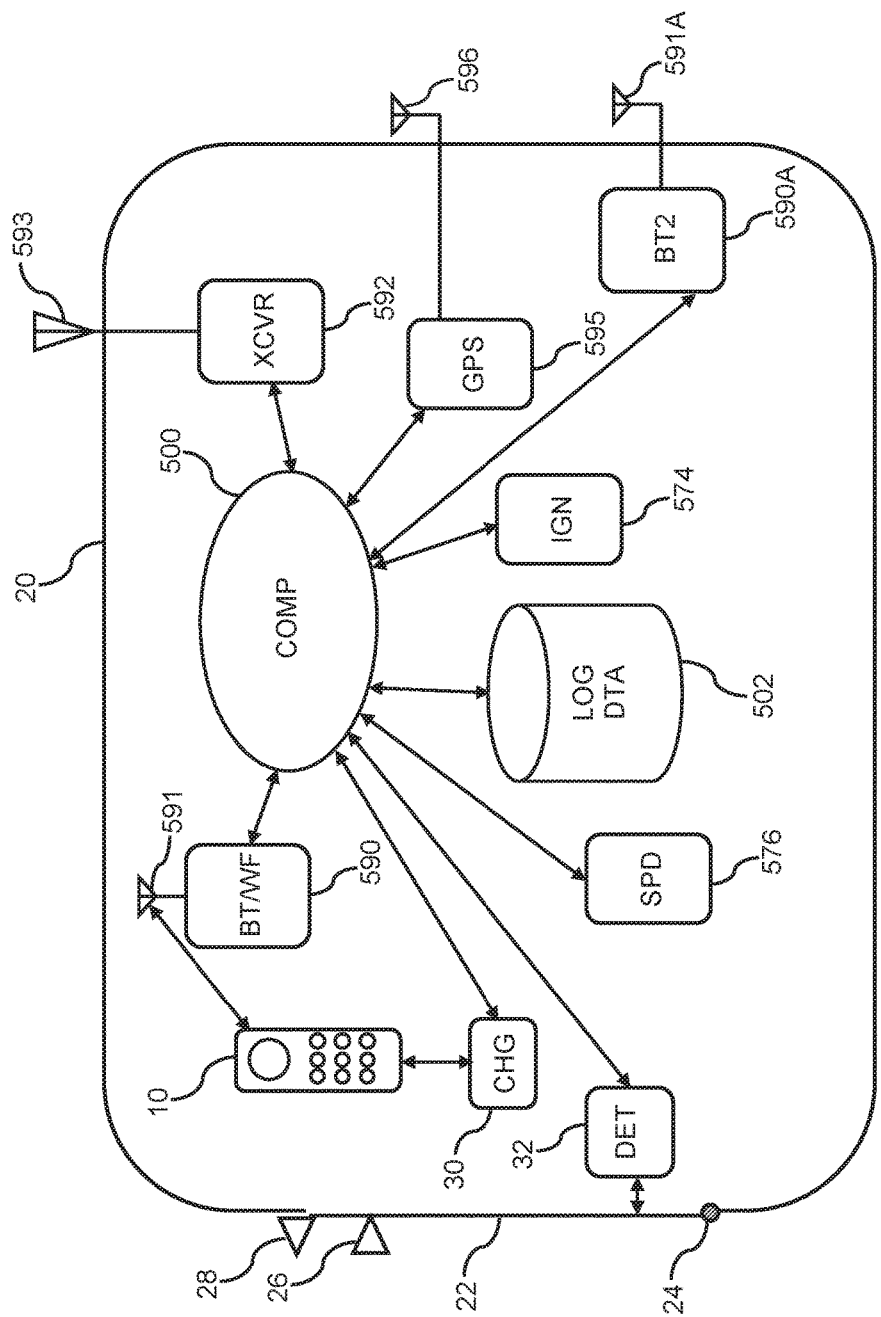
FIG. 1 illustrates a data connection diagram of the system for reducing driving while texting.

Reference will now be made in detail to the presently preferred embodiments of the invention, examples of which are illustrated in the accompanying drawings. Throughout the following detailed description, the same reference numerals refer to the same elements in all figures.

Throughout this description, the term "driver" refers to the holder of a user device that is performing the task of driving. Although the disclosed invention is applicable to any driver, the disclosed invention is intended to be used by a driver who is supervised by another such as a young driver supervised by a parent, a handicapped driver supervised by another, a husband/wife that is supervised by a wife/husband, etc.

Although this description concentrates on a single driver and a single user device, it is fully anticipated that there are multiple potential drivers, each having a user device, or there are multiple user devices per driver. As it is difficult to determine which of the potential drivers are actually driving, it is up to the parent/guardian to set rules as to which user device(s) must be confined in the containment vessel.

Throughout this description, a user device is secured so as to prevent usage while driving. For clarity and brevity reasons, a smartphone 10 (see FIGS. 1-2) is used to represent this user device, though any communications device is equally anticipated including, but not limited to, a personal computer, a tablet computer, a smartwatch, etc. Typically, the user device (e.g. smartphone 10) is assigned or owned by a user that is being supervised, for example, a young driver that is supervised by a parent/guardian, etc. Therefore, throughout this document, for clarity reasons, the user is described in the context of a dependent of a parent/guardian, though there are no limitations as to such. For example, it is fully anticipated that the user be a truck driver and the parent/guardian be an employer of the truck driver, whereas the employer of the truck driver wants to be assured that the truck driver is not using a user device (e.g. smartphone 10 of the truck driver) while driving.

Referring to FIG. 1, a data connection diagram of the exemplary system for reducing driving while texting is shown. In this example, the smartphone 10 of the driver attempts to emit radio frequency signals (e.g. attempts to connect to a cell tower). Such transmissions are attenuated by a containment vessel 20 that forms a partial or full faraday shield around the smartphone 10, preventing the smartphone 10 from communicating with external radio frequency systems such as a cell tower (not shown for brevity reasons). Note that a true faraday shield blocks out all radio frequency signals, but a partial faraday shield allows low signal levels to enter the containment vessel 20, but such low signal levels are insufficient to establish contact with the cellular system and cell towers. Therefore, whenever the smartphone 10 of the driver is within the containment vessel 20, the driver is precluded from talking or texting since the smartphone 10 of the driver will not be in communications contact with a cell tower.

Such attenuation reduces the signal strength of a cellular radio signal from the smartphone 10 to a low enough level so that the smartphone 10 cannot establish communications with a cellular tower. Likewise, in some embodiments, attenuation also occurs for radio frequency signals in the Bluetooth radio frequency range so that a smartphone 10 that is outside of the containment vessel 20 cannot communicate with a transceiver 590 that is within the containment vessel 20 until the smartphone 10 is placed within the containment vessel 20.

In some embodiments, the containment vessel 20 is a box-like structure having a door 22 that attaches by a hinge 24, though any form of opening or orifice that accepts the smartphone 10 of the driver is anticipated, for example, a sliding door, a scrolling door like on a pencil box, etc. In some embodiments, the door 22 has a handle 26. In some embodiments, the door 22 has a lock 28.

As the smartphone 10 will not be able to communicate with a cell tower, it is anticipated that battery life of the smartphone 10 will be reduced. Therefore, in some embodiments, a charger 30 is provided for connecting to the smartphone 10 while the smartphone 10 is within the containment vessel 20. In some embodiments, the charger 30 is a wireless charger.

Within or external to the containment vessel 20 is logic (e.g., a door detect sensor 32) that detects when the door 22 is open, when the smartphone 10 is present within the containment vessel 20, and when the vehicle 580 (see FIG. 3) is moving, as well as other functions as necessary.

To detect that the door 22 is open or closed, a door detect sensor 32 is configured within the containment vessel 20. Any form of door detect sensor 32 is anticipated, including, but not limited to micro switches, light sensors, cell tower sensors (detecting radio waves from a cell tower), magnetic switches, etc. It is important that the door detect sensor 32 is difficult to defeat so that the driver cannot fool the system for reducing driving while texting into believing that the door 22 is closed when in fact, the door 22 is open. Such is anticipated to be performed, for example, by burying the door detect sensor 32 within the containment vessel 20 with linkages from the door 22.

To detect the presence of the smartphone 10 of the driver, the smartphone 10 of the driver is registered with the system for reducing driving while texting. In such, any unique address of any radio within the smartphone 10 of the driver is recorded by the system for reducing driving while texting and saved. In one example, a MAC address of the Wi-Fi transceiver 99 is used to identify the smartphone 10 of the driver (Wi-Fi transceivers 99 broadcast a unique MAC address when they search for nearby Wi-Fi networks). In another example, a transceiver 590 with antenna 591 of the system for reducing driving while texting is paired with a Bluetooth transceiver of the smartphone 10 that is within the containment vessel 20, as Bluetooth radios have unique address (every Bluetooth device has a unique 48-bit address, commonly abbreviated BD_ADDR and usually be presented as a 12-digit hexadecimal value). It is anticipated that the parent or other guardian pairs the smartphone 10 of the driver, registers the driver's smartphone 10 with the system for reducing driving while texting as part of the setup and installation procedures. Through this process, when the smartphone 10 of the driver is within the containment vessel 20, the logic (computer 500) is informed whether the registered device and/or paired device is within the containment vessel 20, thereby preventing the driver from placing another device in the containment vessel 20 to thwart detection. By also monitoring the door detect sensor 32, the logic (computer 500) is able to determine that the smartphone 10 of the driver is within the containment vessel 20 and the door 22 is closed. In this way, the driver cannot simply place another phone in the containment vessel 20 to spoof the system for reducing driving while texting, as this other phone will not be paired with the transceiver 590. An absence of the smartphone 10 (user device) is detected by a lack of connection between the Bluetooth transceiver 93 of the smartphone 10 and the radio transceiver 592 of the system for reducing driving while texting and, in some embodiments, the door detect sensor 32 indicating that the door 22 is open.

In some embodiments, a second transceiver 590A with a second antenna 591A that extends external to the containment vessel 20 is provided for detecting registered devices (e.g. smartphones 10) that are external to the containment vessel 20. This is used, for example, to determine that a registered device is present external to the containment vessel 20. For example, if there are multiple potential drivers of one vehicle 580, then one may have their device within the containment vessel 20 and the other may have their device external to the containment vessel 20.

In another scenario, the driver forgot to bring their registered device (e.g. forgot their smartphone 10 at home) and, therefore, there is no registered device in the containment vessel 20, but there is also no registered device within the vehicle 580. In such, the second transceiver 590A with a second antenna 591A that extends external to the containment vessel 20 will not detect the registered device within the vehicle 580 and record such.

In some embodiments, the containment vessel 20 is a stand-alone system that is mounted or attached to the vehicle 580 or not attached to the vehicle 580. In some embodiments, the containment vessel 20 that is a stand-alone system is powered by a battery and/or interfaced to the power system of the vehicle 580 (e.g. through a USB or cigarette lighter plug).

In some embodiments, the containment vessel 20 is integrated into the vehicle 580, for example, the containment vessel 20 is the glove compartment or console compartment of the vehicle 580. In such, it is anticipated that power is provided directly from the power subsystem of the vehicle 580.

The system for reducing driving while texting needs to determine when the vehicle is moving to record/report when the smartphone(s) 10 of the driver is external to the containment vessel 20 while the vehicle 580 is moving. To know when the vehicle 580 is moving, the computer 500 has access to devices that provide data indicating that the vehicle 580 is in motion. One device that provides data indicating that the vehicle 580 is in motion is a global positioning receiver 595. This is one device for detecting movement. In this, data from the global positioning receiver 595 is monitored by the logic (computer 500) and changes in latitude and longitude are monitored, corresponding to movement of the vehicle 580. If such changes are detected while the smartphone 10 of the driver is external to the containment vessel 20, the logic (computer 500) records/reports that the smartphone 10 of the driver is external to the containment vessel 20 during driving (e.g. writes data to a log file 502 indicating the location and time of the infraction). As the containment vessel 20 is a partial or full faraday shield, the antenna 596 of the global positioning receiver 595 is mounted outside of the containment vessel 20 in order to be able to receive radio frequency signals from the geo-stationary satellite network (not shown for brevity and clarity reasons).

In some embodiments, particularly when the containment vessel 20 is integrated into the vehicle 580, for example, within the glove compartment or console compartment of the vehicle 580, data is available from the vehicle 580 that indicates whether the vehicle is moving. For one, a speed sensor interface 576 connected to a speed sensor 577 of the vehicle 580, informing the logic (computer 500) when the vehicle 580 is moving (e.g. speed is greater than zero). This is another device for detecting movement. Another indication of movement is an ignition interface 574 that is connected to the ignition 579 of the vehicle 580, informing the logic (computer 500) when the vehicle 580 is running, even if the vehicle 580 is at rest. This is another device for detecting movement, in that, when the ignition is on, it is anticipated that the vehicle 580 is being driven.

Once it is determined that the smartphone 10 of the driver is not within the containment vessel 20 and the vehicle is either running and/or moving, actions are taken to record the event and/or contact the parent/guardian of the infraction. In one embodiment, data regarding the infraction is written to the log file 502, for example, the location and time of the infraction, the length of the infraction, driving speed during the infraction, etc. In such, once a connection is made between the radio transceiver 592 of the system for reducing driving while texting and data network that is connected to a device of the parent/guardian (e.g. a smartphone owned by the parent/guardian), a message is sent from the radio transceiver 592 of the system for reducing driving while texting and the device of the parent/guardian indicating details of the infraction. In one embodiment, the radio transceiver 592 is a Wi-Fi transceiver and when the driver moves the vehicle to within range of a wireless home Wi-Fi network of the parent/guardian (e.g. in the driveway or garage of the parent's/guardian's home) data from the log file 502 is transferred to the device of the parent/guardian where an application presents the data to the parent/guardian and, hopefully, the data indicates that the driver did not use their smartphone 10 while driving, otherwise, the parent/guardian has the information needed to reprimand the driver (e.g. take away driving privileges, take away cellphone privileges).

In another embodiment, the radio transceiver 592 is a wide-area data transceiver (e.g. a cellular transceiver or a Wi-Fi transceiver that connects to wide-area Wi-Fi networks that are present in many towns and cities). In such, data is simultaneously transferred to the parent/guardian as it is written to the log file 502, providing immediate notification to the parent/guardian when an infraction occurs.

As the containment vessel 20 is a partial or full faraday shield, the antenna 593 of the radio transceiver 592 is mounted outside of the containment vessel 20 in order to be able to receive and transmit radio frequency signals, e.g. to/from the wireless home Wi-Fi network or computer of the parent/guardian.

It is fully anticipated that there are multiple potential drivers, each having a user device. In such, the parent/guardian has the ability to dictate which user device(s) (e.g. smartphone 10) must be within the containment vessel 20. In such embodiments, it is anticipated that a second transceiver 590A includes a second antenna 591A that extends outside of the containment vessel 20 for detection of a user device or user devices (e.g. smartphone(s) 10) that are external to the containment vessel 20.

It is fully anticipated that there are multiple user devices per driver (e.g. a smartphone 10 and a smartwatch). In such, the parent/guardian has the ability to dictate which user device(s) (e.g. smartphone 10) must be within the containment vessel 20 while the driver is driving. In such embodiments, it is anticipated that the transceiver 590 has the ability to detect and/or pair with multiple user devices (e.g. smartphones 10, etc.) to log which devices are within the containment vessel 20 during driving (motion of the vehicle 580).

Figure 2:
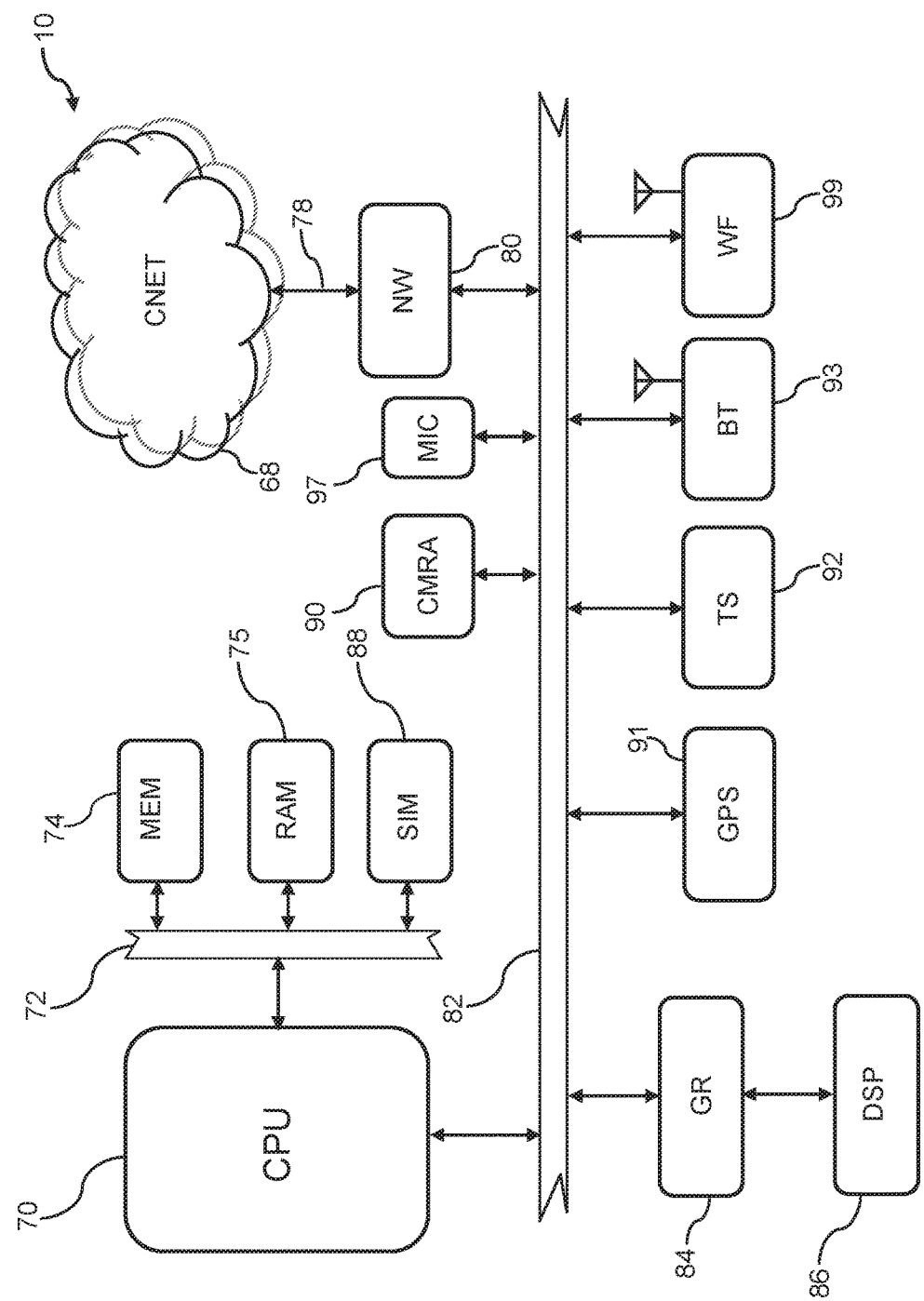
FIG. 2 illustrates a schematic view of a typical smartphone.

Referring to FIG. 2, a schematic view of a typical smart device, a smartphone 10 is shown though other portable (wearable or carried with a person) end-user devices such as tablet computers, smartwatches, smart ear buds, smart eyewear, personal fitness devices, etc., are fully anticipated. Although any end-user device is anticipated, for clarity purposes, the smartphone 10 of the driver will be used in the remainder of the description.

The example smartphone 10 of the driver represents a typical device and is shown in one form with a sample set of features. Different architectures are known that accomplish similar results in a similar fashion and the present invention is not limited in any way to any particular smartphone 10 of the driver architecture or implementation. In this exemplary smartphone 10 of the driver, a processor 70 executes or runs programs in a random-access memory 75. The programs are generally stored within a persistent memory 74 and loaded into the random-access memory 75 when needed. Also accessible by the processor 70 is a SIM card 88 (subscriber information module) having a subscriber identification and often persistent storage. The processor 70 is any processor, typically a processor designed for phones. The persistent memory 74, random-access memory 75, and SIM card are connected to the processor by, for example, a memory bus 72. The random-access memory 75 is any memory suitable for connection and operation with the selected processor 70, such as SRAM, DRAM, SDRAM, RDRAM, DDR, DDR-2, etc. The persistent memory 74 is any type, configuration, capacity of memory suitable for persistently storing data, for example, flash memory, read only memory, battery-backed memory, etc. In some exemplary smartphones 10, the persistent memory 74 is removable, in the form of a memory card of appropriate format such as SD (secure digital) cards, micro SD cards, compact flash, etc.

Also connected to the processor 70 is a system bus 82 for connecting to peripheral subsystems such as a cellular network interface 80, a graphics adapter 84 and a touch screen interface 92. The graphics adapter 84 receives commands from the processor 70 and controls what is depicted on the display 86. The touch screen interface 92 provides navigation and selection features.

In general, some portion of the persistent memory 74 and/or the SIM card 88 is used to store programs, executable code, and data, etc. In some embodiments, other data is stored in the persistent memory 74 such as audio files, video files, text messages, etc.

The peripherals are examples and other devices are known in the industry such as Global Positioning Subsystem 91, speakers, microphones, USB interfaces, camera 90, microphone 97, Bluetooth transceiver 93, Wi-Fi transceiver 99, image sensors, temperature sensors, health sensors, biometric sensors, etc., the details of which are not shown for brevity and clarity reasons. One feature of the Bluetooth transceiver and the Wi-Fi transceiver 99 is a unique address that is encoded into transmissions that is used to uniquely correlate between the smart device (smartphone 10) and the user.

The cellular network interface 80 connects the smartphone 10 to the cellular network 68 through any cellular band and cellular protocol such as GSM, TDMA, LTE, etc., through a wireless medium 78. There is no limitation on the type of cellular connection used. The cellular network interface 80 provides voice call, data, and messaging services to the smartphone 10 through the cellular network 68.

For local communications, many smartphones 10 include a Bluetooth transceiver 93, a Wi-Fi transceiver 99, or both. Such features of smartphones 10 provide data communications between the smartphones 10 and data access points and/or other computers such as a personal computer (not shown). In the system for reducing driving while texting, the Bluetooth transceiver 93 and/or a Wi-Fi transceiver 99, or both, are used to identify when the smartphone 10 of the driver is within the containment vessel 20.

Figure 3:
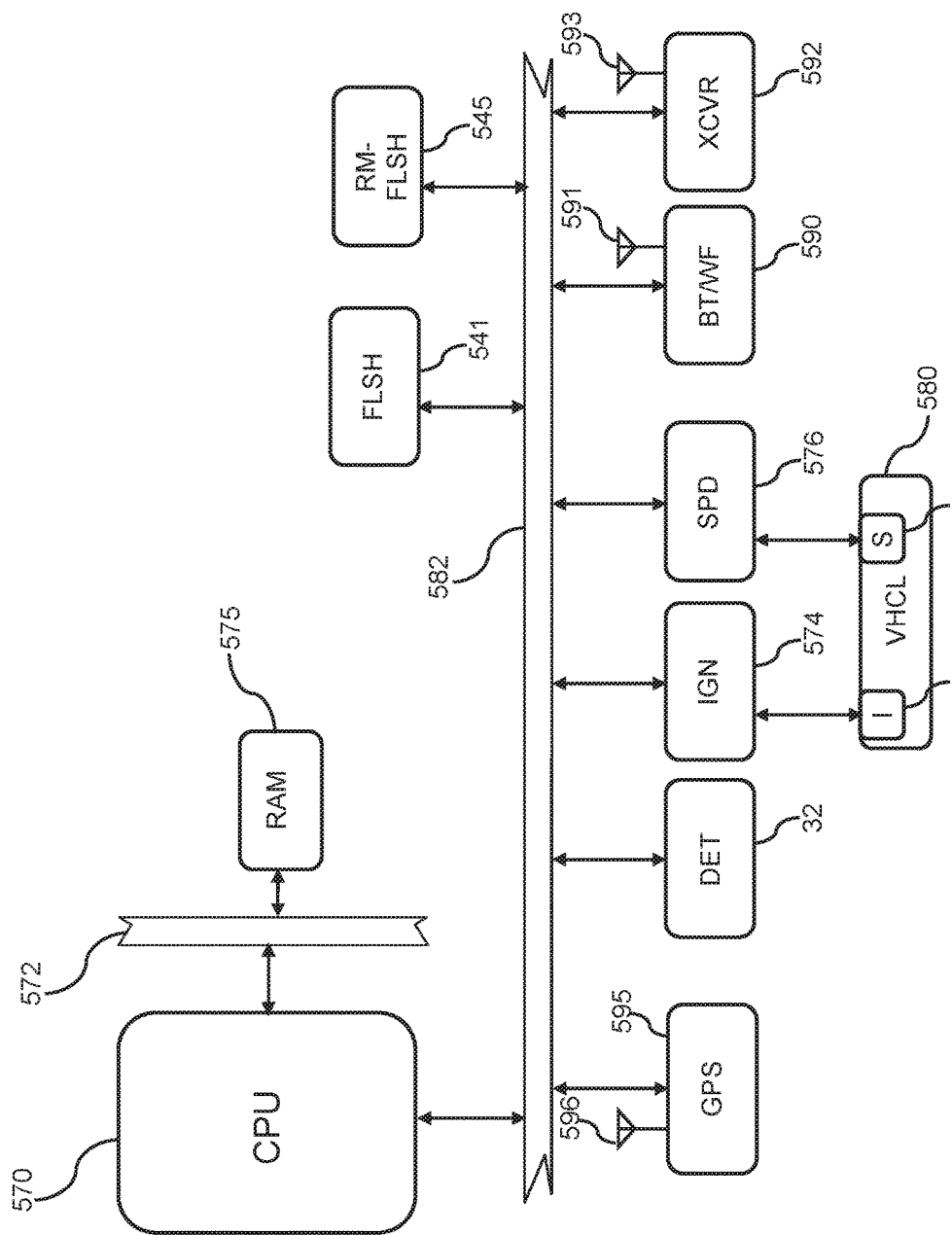
FIG. 3 illustrates a schematic view of a typical computer system of the reducing driving while texting.

Referring to FIG. 3, a schematic view of a typical computer system 500 is shown. The example computer system 500 represents a typical computer system used in the system for reducing driving while texting for determining when the smartphone 10 of the driver is within the containment vessel 20 and when the vehicle 580 is being operated by the driver. This exemplary computer system is shown in its simplest form. Different architectures are known that accomplish similar results in a similar fashion and the present invention is not limited in any way to any particular computer system architecture or implementation.

Although represented as a computer system 500 having a single processor 570, it is fully anticipated that other architectures be used to obtain the same or similar results.

In the example computer system 500 of FIG. 3, a processor 570 (e.g. embedded processor, programmable interrupt controller, etc.) executes or runs programs in a random-access memory 575. The programs are generally stored within a persistent memory 541 and loaded into the random-access memory 575 when needed. The processor 570 is any processor, typically a processor designed for computer systems with any number of core processing elements, etc. The random-access memory 575 is connected to the processor by, for example, a memory bus 572. The random-access memory 575 is any memory suitable for connection and operation with the selected processor 570, such as SRAM, DRAM, SDRAM, RDRAM, DDR, DDR-2, etc. The persistent memory 541 is any type, configuration, capacity of memory suitable for persistently storing data, for example, magnetic storage, flash memory, read only memory, battery-backed memory, magnetic memory, etc. The persistent memory 541 (e.g., flash storage) is typically interfaced to the processor 570 through a system bus 582, or any other interface as known in the industry.

Also shown connected to the processor 570 through the system bus 582 is a global positioning receiver 595 (e.g., for determining movement of the vehicle 380), an ignition interface 574 that is connected to the ignition 579 of the vehicle 50, and a speed sensor interface 576 that is connected to the speed sensor 577 of the vehicle 580. The door detect sensor 32 is also connected to the system bus 582.

For detecting presence of the user device or smartphone 10 of the driver, a transceiver 590 with the antenna 591 that is internal to the containment vessel 20 is interface to the system bus for access by the processor 570.

For communicating with the parent's/guardian's device and/or wireless home network, a radio transceiver 592 with the antenna 593 that is external to the containment vessel 20 is interface to the system bus for access by the processor 570. In such, when connectivity is established, data from the log file 502 is accessible by a device (e.g. computer system) operated by the patent/guardian. In some embodiments, there is no radio transceiver 592 and, instead, the parent/guardian connects their device directly to the system for reducing driving while texting or a removable memory device 545 is connected to the system for reducing driving while texting (connected to the system bus 582) and the log file 502 is transferred to the memory device.

In some embodiments, the radio transceiver 592 is a wide-area transceiver (e.g. a cellular transceiver) and data regarding operation of the vehicle 580 and usage of the smartphone 10 (or any device) is accessible by a device (e.g. computer system) operated by the patent/guardian.

In general, some portion of the persistent memory 541 is used to store programs, executable code, data, and the log file 502, etc.

Figure 4:
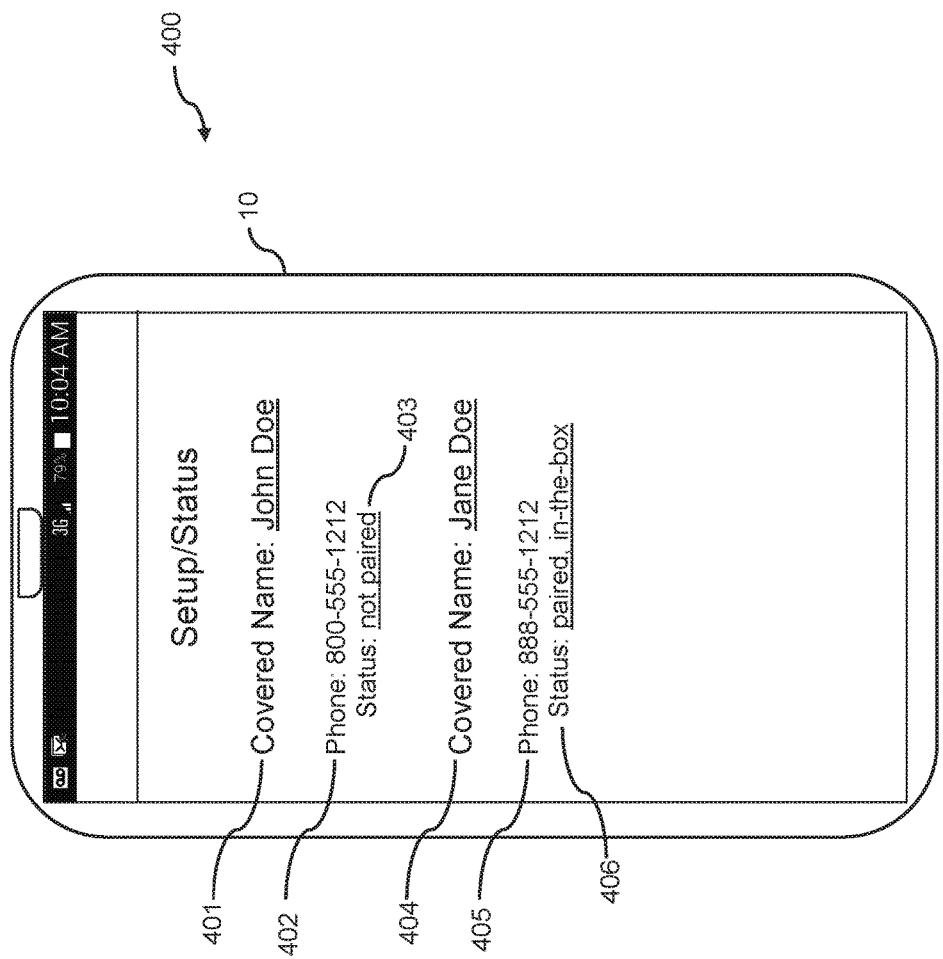
FIG. 4 illustrates a first typical user interface of the system for reducing driving while texting.

Referring to FIG. 4, a first typical setup/status user interface 400 of the system for reducing driving while texting is shown. In this, two users are configured, a first user 401 (e.g. John Doe) and a second user 404 (e.g. Jane Doe). The phone number 402 of the smartphone 10 of the first user 401 is shown and the smartphone 10 of the first user 401 has not been registered/paired yet per the first user's status line 403. The phone number 405 of the smartphone 10 of the second user 404 is shown and the smartphone 10 of the second user 404 has been registered/paired and is currently within the containment vessel 20 as shown on the second user's status line 406.

The parent/guardian has access to the setup/status user interface 400 to understand the status and to setup each user (e.g. child or other watched person). Since the first user 401 has not been setup, the parent/guardian initiates setup per a process similar to that of FIG. 6 by, for example, clicking on the first user's status line 403. In such, at least one unique identifier of the device used by the first user 401 (e.g. smartphone 10) is captured and associated with the first user 401, for example a Wi-Fi MAC address or a Bluetooth address.

Figure 5:
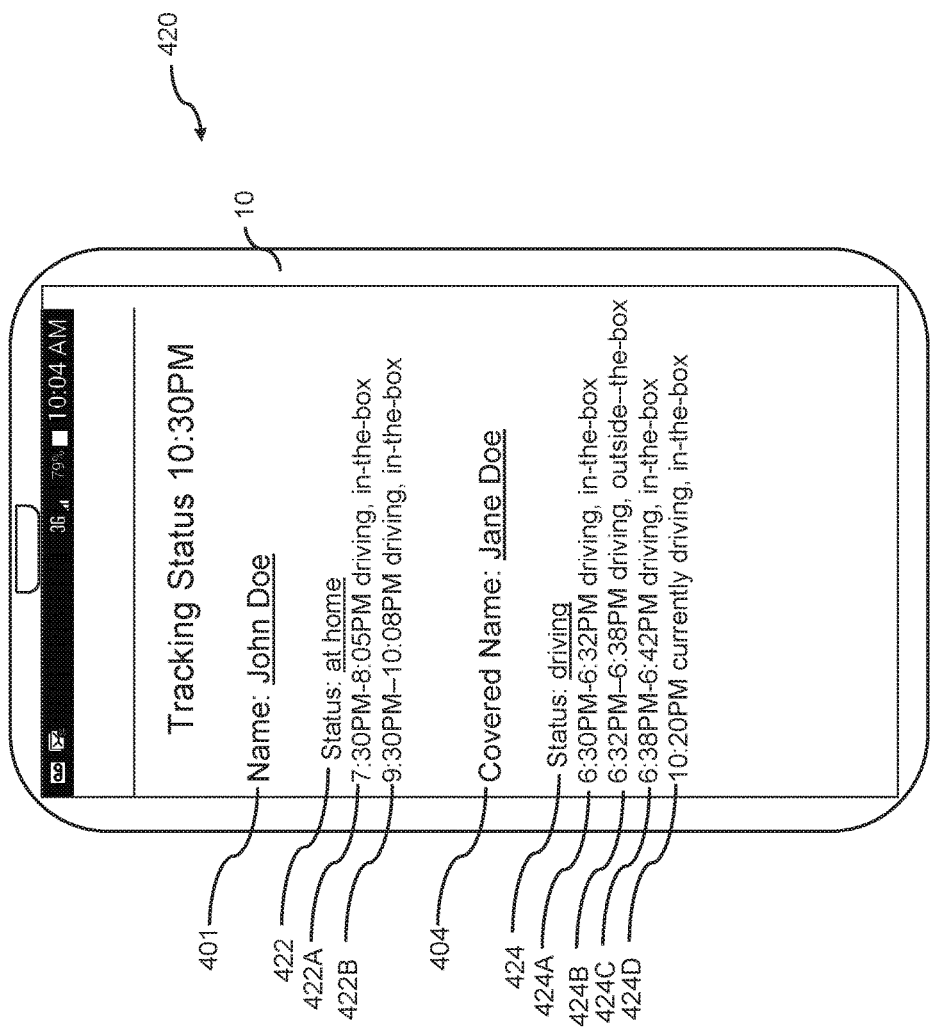
FIG. 5 illustrates a second typical user interface.

Referring to FIG. 5, a second typical user interface 420 of the system for reducing driving while texting is shown. In this example, again, two users are configured, a first user 401 (e.g. John Doe) and a second user 404 (e.g. Jane Doe).

The second typical user interface 420 is shown after the parent/guardian device (e.g. smartphone 10) has received data regarding the users 401/404, either through continuous reception of events sent from the radio transceiver 592 or through reception of the log file 502 either through the radio transceiver 592 or through any known file transfer mechanism (e.g. transfer of removable memory devices).

The first user 401 has a status of "at home" 422 and has two log records 422A/422B showing that the first user 401 was driving for a time period from 7:30 PM to 8:05 PM and again for a time period from 9:30 PM to 10:08 PM, both times with the smartphone 10 of the first user 401 within the containment vessel 20. It is anticipated that in some embodiments, the log records 422A/422B are uploaded to the parent/guardian computer when the first user 401 reaches home (e.g. over Wi-Fi). It is also anticipated that in some embodiments, the log records 422A/422B are uploaded to the parent/guardian computer when the first user 401 is away from home and out of range of the home-based local area network (e.g. over Wi-Fi), in this case using a wide area network such as cellular communications.

The second user 404 has a status of "driving" 424 and has four log records 424A/424B/424D/424E showing that the second user 404 was driving for a time period from 6:30 PM to 6:32 PM with the smartphone 10 of the second user 404 within the containment vessel 20 then at 6:32 PM showing that the second user 404 was driving for a time period with the smartphone 10 of the second user 404 outside the containment vessel 20 (likely calling or texting). The third log record 424C shows the smartphone 10 of the second user 404 within the containment vessel 20 while driving. The fourth entry 424D shows that the second user 404 is still driving (e.g. driving home). In this embodiment, since the second user 404 is not at home, it is understood that the log records 424A/424B/424D/424E were uploaded to the parent/guardian computer using a wide area network such as cellular communications.

Figure 6:
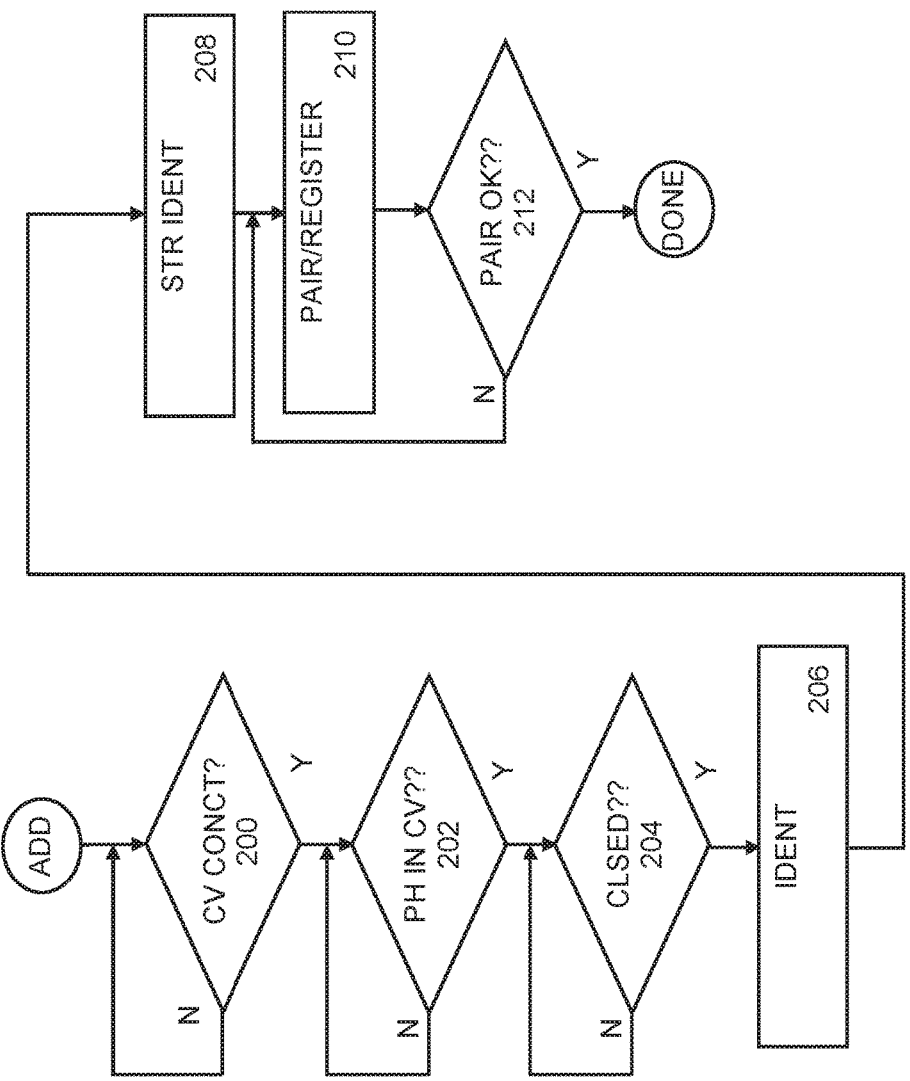
FIG. 6 illustrates an exemplary program flow for provisioning of the system for reducing driving while texting.

Referring to FIG. 6, an exemplary program flow for provisioning of the system for reducing driving while texting is shown. The basis of operation of the system for reducing driving while texting is that, when a user is driving, the smartphone 10 of the user is within the containment vessel 20 and the door 22 of the containment vessel 20 is closed (and locked). Since the containment vessel 20 is a partial or full faraday shield (at least blocking frequencies in the cellular bands and Bluetooth bands), the driver cannot place the smartphone 10 on top of the containment vessel 20, as the transceiver 590 of the system for reducing driving while texting will not detect radio signals from the smartphone 10 of the driver, as the Bluetooth signals will not penetrate the containment vessel 20 when the door 22 of the containment vessel 20 is closed.

For security reasons, the device (e.g. smartphone 10) of the driver is registered or paired with the system for reducing driving while texting through the transceiver 590. In this way, the driver (e.g. young adult driver) cannot simply place a smartphone 10 of another person into the containment vessel 20 and fool the system for reducing driving while texting. Therefore, adding a smartphone 10 of the driver includes making sure the containment vessel 20 is connected 200 to the home network (either through a local area network such as Wi-Fi or through a wide-area network such as the cellular network). Once connected 200, it is determined if the smartphone 10 of the driver is within 202 the containment vessel 20. Once the smartphone 10 of the driver is within 202 the containment vessel 20, if is determined if the door 22 of the containment vessel 20 is closed. Once the smartphone 10 of the driver is within 202 the containment vessel 20 and the door 22 of the containment vessel 20 is closed, identity information of the smartphone 10 is captured 206 (either entered by the parent/guardian or read directly from the smartphone 10 of the driver) and the identification information is stored 208. Now registering or pairing 210 of the smartphone 10 of the driver with the system for reducing driving while texting is performed and once registering or pairing 210 has completed successfully 212, this portion of the program flow completes.

Figure 7:
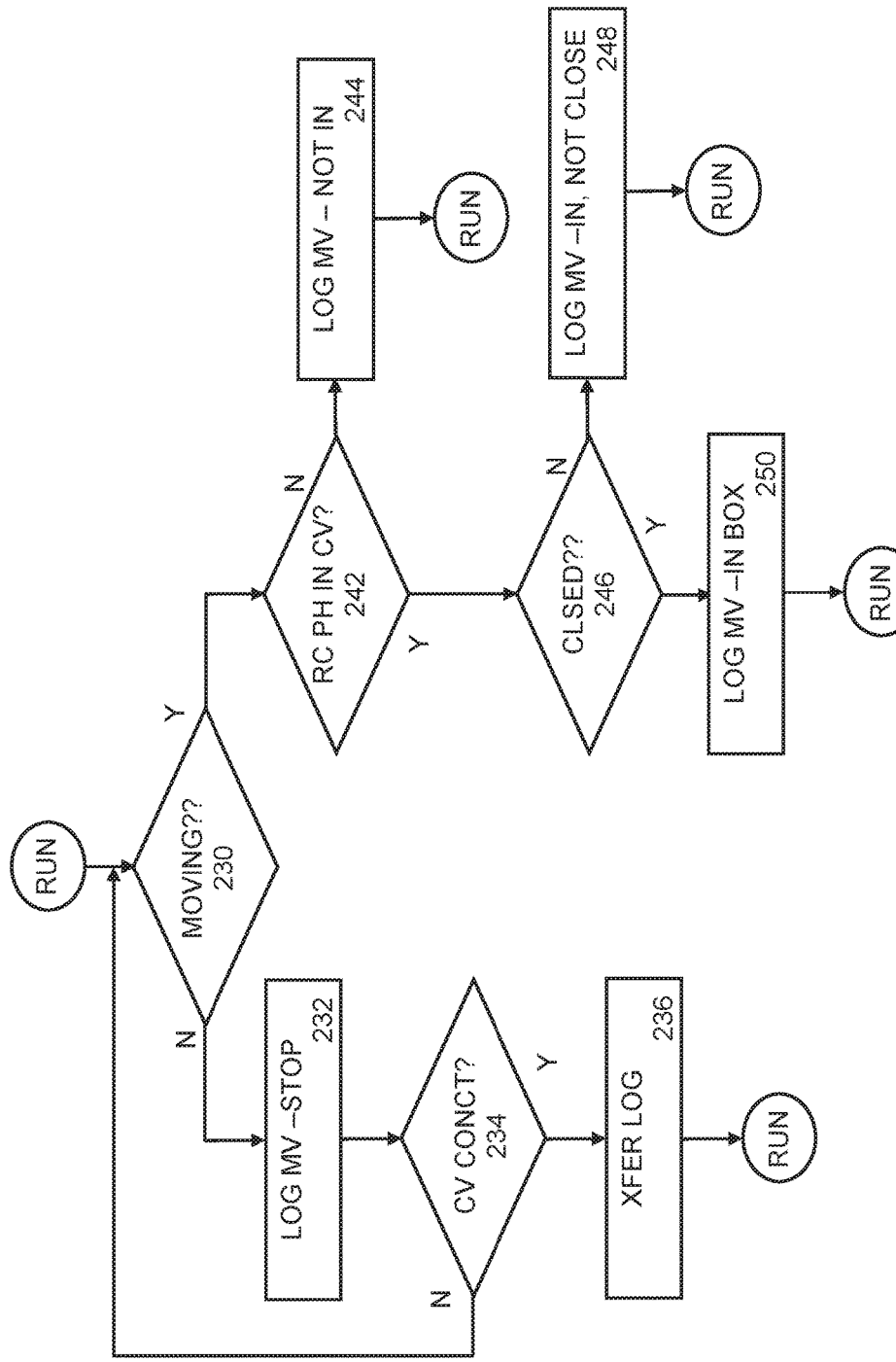
FIG. 7 illustrates an exemplary program flow for operation of the system for reducing driving while texting.

Referring to FIG. 7, an exemplary program flow for operation of the system for reducing driving while texting is shown. It is anticipated that the exemplary program flow for operation of the system for reducing driving while texting will operate on the processor 570 (or other logic) of the containment vessel 20.

In a continuous loop, it is determined if the vehicle 580 is moving 230, for example utilizing the global positioning receiver 595 of the containment vessel 20, monitoring the speed sensor 577 and/or ignition 579 of the vehicle 580, monitoring radio frequency signals utilizing the radio transceiver 592 with the antenna 593 (external antenna), etc. In embodiments in which moving is determined by monitoring radio frequency signals utilizing the radio transceiver 592 with the antenna 593 (external), it is anticipated that, as the vehicle 580 moves, signal strengths of various Wi-Fi or Bluetooth transceivers within range of the radio transceiver 592 will increase/decrease, indicating movement of the vehicle 580.

If it is determined that the vehicle is not moving 230, a log record indicating stopped 232 is written to the log file 502. To simplify the flow diagram for clarity and understanding, it is anticipated that, in a preferred embodiment, sequential writing of multiple log records of the same information is suppressed as known in the business, so that adjacent log records indicate something has changed (e.g. changed from stopped to moving, etc.). Now that the vehicle 580 is stopped, it is determined if it is possible to connect 234 to the home network or home computer. If it is possible to connect 234 to the home network or home computer, then the log file 502 is transferred 236 to the home network or home computer for viewing and analysis by the parent/guardian (see FIG. 5).

If it is determined that the vehicle is moving 230, then it is determined if the smartphone 10 of the driver is within 242 the containment vessel 20. If the smartphone 10 of the driver is not within 242 the containment vessel 20, a record is written indicating not within 244 the containment vessel 20 (e.g. the vehicle 580 is moving and the smartphone 10 of the driver is not in the containment vessel 20).

If the smartphone 10 of the driver is within 242 containment vessel 20, it is determined if the door 22 of the containment vessel 20 is closed 246 and, optionally, locked. If the smartphone 10 of the driver is within 242 the containment vessel 20 but the door 22 of the containment vessel 20 is not closed 246, a record is written 248 to the log file 502 indicating within the containment vessel 20 (e.g. the vehicle 580 is moving and the smartphone 10 of the driver is not in the containment vessel 20) and the door 22 is not closed 246.

If the smartphone 10 of the driver is within 242 the containment vessel 20 and the door 22 of the containment vessel 20 is closed 246, a log record is written 250 indicating that the smartphone 10 is properly within the containment vessel 20 (e.g. the vehicle 580 is moving and the smartphone 10 of the driver is in the containment vessel 20 and the door 22 is closed).

In some embodiments, the system for reducing driving while texting is implemented as part of a vehicle computer system or integrated with the vehicle computer system (not shown) so as to enable features including limiting vehicle speed/acceleration when the driver's smartphone 10 is present in the vehicle 580, but not secured within the containment vessel 20.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for reducing driving while texting, the system comprising:

a containment vessel, the containment vessel having shielding that attenuates cellular radio signals thereby preventing a user device held within the containment vessel from communicating to a cellular radio transceiver that is external to the containment vessel;

means for detecting the presence of the user device within the containment vessel;

means for detecting movement of a vehicle in which the containment vessel is held;

means for logging at least time periods in which movement is detected by the means for detecting movement and an absence of the user device is detected by the means for detecting the presence of the user device; and means for reporting the time periods.

2. The system of claim 1, wherein the containment vessel includes a door through which the user device is inserted into the containment vessel.

3. The system of claim 2, further comprising means for detecting that the door is closed.

4. The system of claim 1, wherein the means for detecting movement comprises a global positioning system.

5. The system of claim 1, wherein the means for detecting movement comprises an interface to a speed sensor of the vehicle.

6. The system of claim 1, wherein the means for detecting the user device within the containment vessel comprises a radio transceiver having an antenna operatively coupled thereto whereas the antenna is within the containment vessel for communicating with a second radio transceiver of the user device that is within the containment vessel.

7. The system of claim 1, wherein the containment vessel is formed as a glove compartment or console compartment of the vehicle.

8. The system of claim 1, wherein the user device is a smartphone.

9. A method of reducing driving while texting comprising:
blocking external radio frequency signals from reaching a user device by a containment vessel when the user device is held within the containment vessel;
communicating with a radio frequency transceiver of the user device to determine that the user device is that of the user by way of a unique identification received from the radio frequency transceiver of the user device while the user device is within the containment vessel;
detecting movement of a vehicle in which the containment vessel is held;
if the vehicle is moving when the user device is not within the containment vessel, logging data indicative of the vehicle moving when the user device is not within the containment vessel; and
reporting the data.

10. The method of claim 9, wherein before the step of communicating with the radio frequency transceiver of the user device to determine that the user device is that of the user, registering the user device by associating the unique identification of the radio frequency transceiver with the user device.

11. The method of claim 9, wherein the step of detecting the movement of the vehicle in which the containment vessel is held is performed by monitoring a location of the vehicle as reported by a global positioning system.

12. The method of claim 9, wherein the step of detecting the movement of the vehicle in which the containment vessel is held is performed by monitoring a speed sensor of the vehicle.

13. The method of claim 9, wherein the step of blocking the external radio frequency signals from reaching the user device that is held within the containment vessel includes the step of placing the user device into the containment vessel through an orifice and then a step of closing a door to close the orifice.

14. The method of claim 9, wherein the user device is a smartphone.

15. A system for reducing driving while texting, the system comprising:
a containment vessel having a door for inserting a user device there within, the containment vessel attenuates cellular radio signals thereby preventing the user device held within the containment vessel from communicating using cellular services;
a radio frequency transceiver of the system for reducing driving while texting searches for a signal from a user device radio frequency transceiver, the presence of the user device within the containment vessel is known when the system radio frequency transceiver receives the signal from the user device radio frequency transceiver and the signal is authenticated as having a pre-registered unique address;
a sensor that detects when the door is closed;
means for detecting movement of a vehicle in which the containment vessel is held;
means for logging at least time periods in which movement is detected by the means for detecting movement and either the door is open or the system radio frequency transceiver does not receive the signal from the user device radio frequency transceiver or the system radio frequency transceiver does not recognize the pre-registered unique address of the user device radio frequency transceiver; and
means for reporting the time periods.

16. The system of claim 15, wherein the means for detecting movement comprises a global positioning system.

17. The system of claim 15, wherein the means for detecting movement comprises an interface to a speed sensor of the vehicle.

18. The system of claim 15, wherein the containment vessel is formed as a glove compartment or console compartment of the vehicle.

19. The system of claim 15, wherein the user device radio frequency transceiver is a Wi-Fi transceiver and the pre-registered unique address of the user device radio frequency transceiver is a MAC address.

20. The system of claim 15, wherein the means for reporting the time periods comprises transferring the time periods to a device of a parent/guardian.

* * * * *